(12) United States Patent
Gundogan et al.

(10) Patent No.: US 7,425,685 B1
(45) Date of Patent: Sep. 16, 2008

(54) CABLE ASSEMBLIES FOR CONNECTING DATA STORAGE CHASSIS TO A CABLE CONDUIT WITHIN A DATA STORAGE SYSTEM

(75) Inventors: C. Ilhan Gundogan, Lexington, MA (US); W. Brian Cunningham, Westborough, MA (US); Joseph P. King, Jr., Sterling, MA (US)

(73) Assignee: EMC Corporation, Hopkinton, MA (US)

( * ) Notice: Subject to any disclaimer, the term of this patent is extended or adjusted under 35 U.S.C. 154(b) by 212 days.

(21) Appl. No.: 11/536,064

(22) Filed: Sep. 28, 2006

(51) Int. Cl.
*H05K 5/00* (2006.01)

(52) U.S. Cl. .................. 174/520; 361/827; 361/797; 361/803; 312/223.1

(58) Field of Classification Search .......... 174/520, 174/50; 361/827, 730, 796, 797, 803; 312/223.1; 211/26
See application file for complete search history.

(56) References Cited

U.S. PATENT DOCUMENTS

| | | | | |
|---|---|---|---|---|
| 5,568,362 A | * | 10/1996 | Hansson | 361/736 |
| 5,571,256 A | * | 11/1996 | Good et al. | 211/26 |
| 5,715,145 A | * | 2/1998 | Wong et al. | 361/796 |
| 5,788,087 A | * | 8/1998 | Orlando | 211/26 |
| 6,246,591 B1 | * | 6/2001 | Ikeda et al. | 361/827 |
| 6,360,422 B1 | * | 3/2002 | Kam | 29/525.11 |
| 6,469,244 B1 | * | 10/2002 | Harrison et al. | 174/360 |
| 7,189,923 B2 | * | 3/2007 | Inagawa et al. | 174/68.1 |
| 2002/0012242 A1 | * | 1/2002 | Lecinski et al. | 361/827 |

* cited by examiner

*Primary Examiner*—Hung V Ngo
(74) *Attorney, Agent, or Firm*—Guerin & Rodriguez LLP; Michael A. Rodriguez

(57) ABSTRACT

A chassis housing disk drives has an electrical plug and an electrical signal connector at its back end. A rack has a compartment for receiving the chassis. A cable conduit mounted to a rack sidewall adjacent the compartment abuts the back end of the chassis. A first cable assembly coupled to the cable conduit includes an electrical plug receptacle and a first cable extending through the cable conduit for conducting power to the electrical plug receptacle. A second cable assembly coupled to the cable conduit includes a data signal connector and a second cable extending through the cable conduit for conducting data signals to and from the data signal connector. The electrical plug receptacle receives the electrical plug and the data signal connector receives the electrical signal connector of the chassis, concurrently, when the chassis slides into the compartment fully, to supply power to and establish communications with the chassis.

22 Claims, 11 Drawing Sheets

CABLE ASSEMBLIES FOR CONNECTING DATA STORAGE CHASSIS TO A CABLE CONDUIT WITHIN A DATA STORAGE SYSTEM

FIELD OF THE INVENTION

The present invention relates generally to data storage systems. More particularly, the present invention relates to cable assemblies connecting chassis to a cable conduit in a high-density data storage system.

BACKGROUND

Enterprises in the data storage industry perpetually face demand from their customers to produce storage solutions that achieve ever-increasing data storage density. One approach is to include multiple disk drives on a carrier. This increased data storage density on a carrier translates into greater data storage density for disk drive enclosures that can house several of such carriers. However, a competing demand is to provide individual serviceability, not only to each disk drive enclosure, but also to each disk drive within the enclosure. Individual serviceability enables field service personnel to remove and replace a failing disk drive without affecting the operation of working drives. A drawback to multiple disk drives on a carrier is that removing the carrier in order to access a failing disk drive operates to remove from service companion disk drives that may not be failing.

SUMMARY

In one aspect, the invention features an electronics system comprising a chassis housing a plurality of disk drives. The chassis has a back end, and an electrical plug and an electrical signal connector at the back end. A rack has opposing sidewalls and a compartment for receiving the chassis. A cable conduit is mounted to one of the sidewalls of the rack adjacent the compartment for receiving the chassis. The cable conduit has a panel portion that abuts the back end of the chassis. First and second cable assemblies are coupled to the panel portion of the cable conduit facing the chassis. The first cable assembly includes an electrical plug receptacle and a first cable that extends through a length of the cable conduit for conducting power from a power source to the electrical plug receptacle. The second cable assembly includes a data signal connector and a second cable that extends through a length of the cable conduit for conducting data signals to and from the data signal connector. The electrical plug receptacle receives the electrical plug and the data signal connector receives the electrical signal connector of the chassis, concurrently, when the chassis slides fully into the compartment in the rack, thereby supplying power to and establishing data signal communications with the chassis.

In another aspect, the invention features an electronics system comprising a chassis housing a plurality of disk drives. The chassis has a back end and an electrical plug at the back end. A rack has opposing sidewalls and a compartment for receiving the chassis. A cable conduit is mounted to one of the sidewalls of the rack adjacent the compartment for receiving the chassis. The cable conduit has a panel portion that abuts the back end of the chassis. A cable assembly is coupled to the panel portion of the cable conduit facing the chassis. The cable assembly includes an electrical plug receptacle and a cable that extends through a length of the cable conduit for conducting power from a power source to the electrical plug receptacle. The electrical plug receptacle receives the electrical plug of the chassis when the chassis slides fully into the compartment in the rack, thereby supplying power to the chassis.

In still another aspect, an electronics system comprising a chassis housing a plurality of disk drives. The chassis has a back end and an electrical signal connector at the back end. A rack has opposing sidewalls and a compartment for receiving the chassis. A cable conduit is mounted to one of the sidewalls of the rack adjacent the compartment for receiving the chassis. The cable conduit has a panel portion that abuts the back end of the chassis. A cable assembly is coupled to the panel portion of the cable conduit facing the chassis. The cable assembly includes a data signal connector and a cable that extends through a length of the cable conduit for conducting data signals to and from the data signal connector. The data signal connector receives the electrical signal connector of the chassis when the chassis slides fully into the compartment in the rack.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION

Data storage systems embodying the invention have modular data storage chassis that install from the front and from the rear of the rack. Pairs of data storage chassis are accordingly "back-to-back" within the rack (i.e., the back of one chassis faces the back of the chassis directly opposite). The back-to-back configuration achieves higher disk drive density than conventional front-only data storage systems, while granting individual frontal access to each data storage chassis for serviceability, either from the front or from the rear of the rack.

Each data storage chassis electrically plugs into a pair of central spines, herein also referred to as cable conduits, and exhausts air through a central chimney (i.e., air plenum). The central spines route the cabling from the data storage chassis at an upper region of the data storage system to a midplane located at a lower region of the data storage system. Movably coupled to the central spines are electrical cable assemblies for making electrical connections to an electrical plug and to an electrical signal connector of the data storage chassis. The movable coupling enables the electrical cable assemblies of the spine to move slightly in order to facilitate blind mating and hot plugging between the data storage chassis and the spines.

Figure 1:
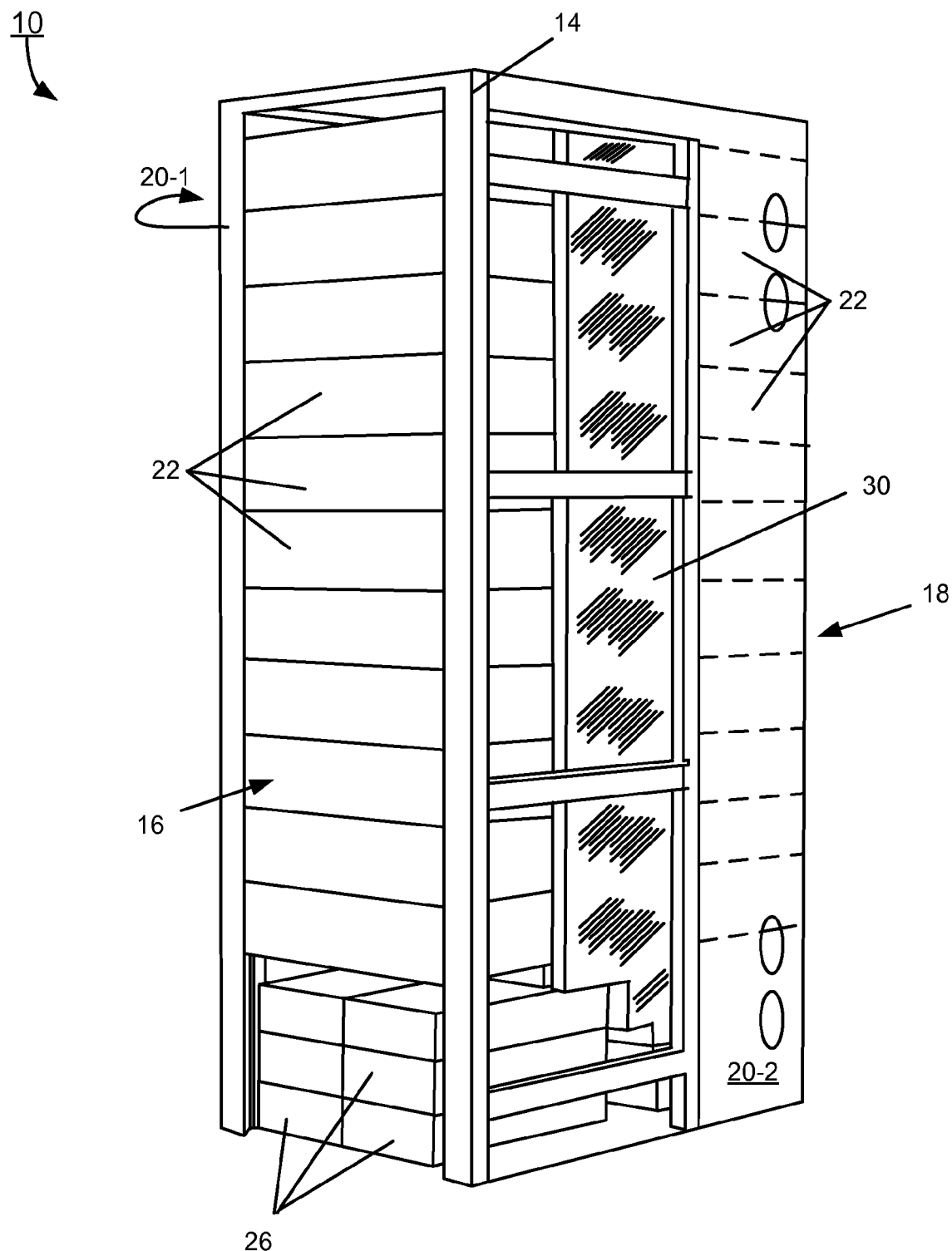
FIG. 1 is a schematic diagram of an embodiment of a data storage system constructed in accordance with the invention.
Figure 2:
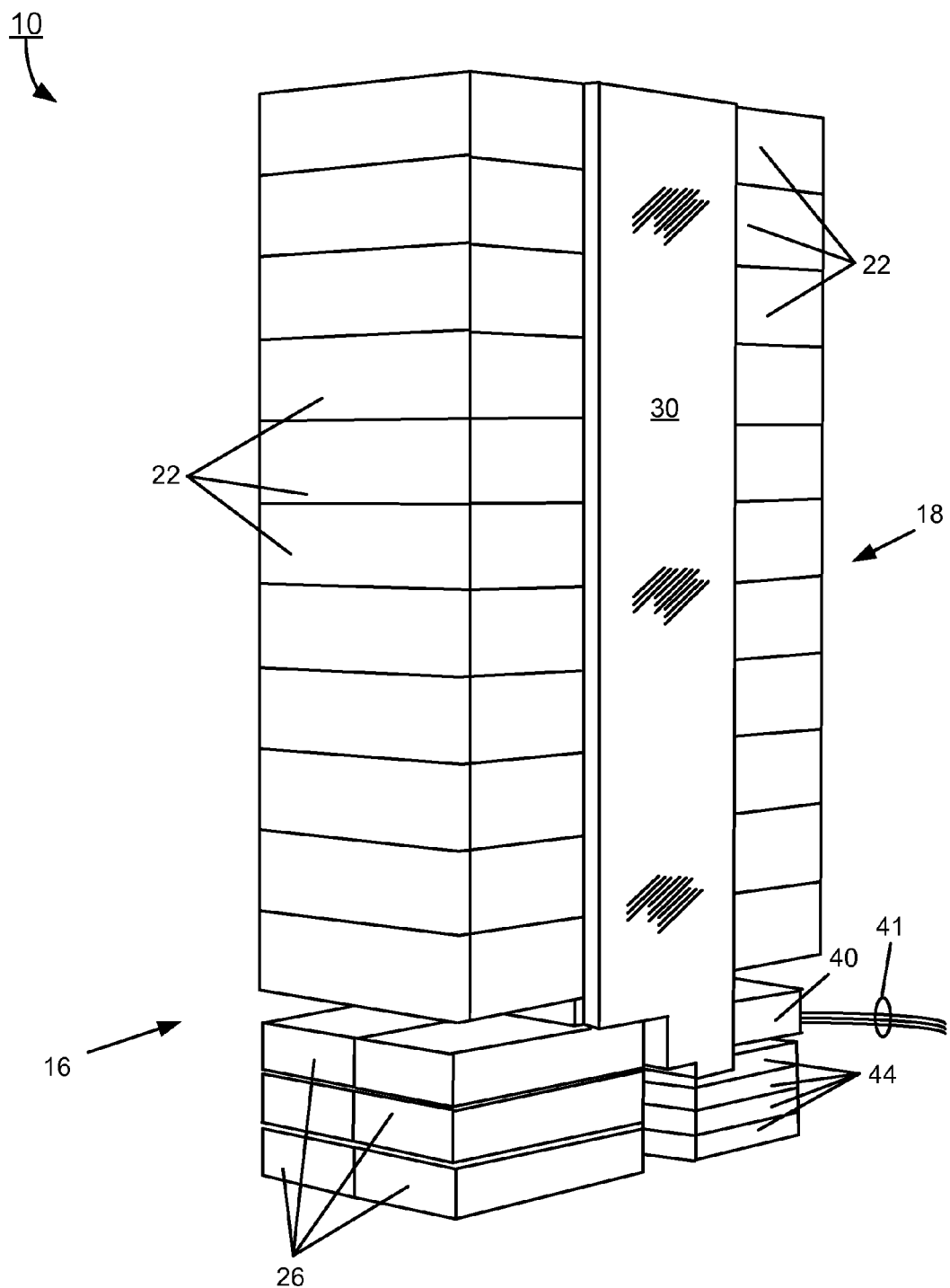
FIG. 2 is a schematic diagram of the data storage system of FIG. 1, without a rack structure.

Referring to FIG. 1 and FIG. 2, shown is an embodiment of a data storage system 10 constructed in accordance with the invention. The data storage system 10 includes a rack 14 having a front side 16, a rear side 18, and opposing sidewalls 20-1, 20-2. In FIG. 2, the rack 14 is missing from FIG. 1 to illustrate more clearly the various internal features of the data storage system 10. In one embodiment, the rack 14 is constructed of sheet metal and has a 24" width, a 39" length, and a 42 U height (1 U is equal to 1.75 inches). Other embodiments of racks may have different heights, widths, and depths.

Mounting or guide rails (not shown) define front compartments for guiding and supporting chassis installed through the front side 16 and rear compartments for guiding and supporting chassis installed through the rear side 18. The placement of such rails can vary during system manufacture to accommodate the varying sizes (e.g., 3U, 2U, etc.) of chassis used to populate the data storage system 10. Accordingly, as used herein, a compartment describes a position in the rack configured for receiving a chassis. Mounting rails, doors, cover, floor, and side panels of the data storage system 10 are not shown to simplify the illustration.

Installed within the rack 14 are front-side disk array enclosures (DAEs) 22, also called data storage chassis, rear-side DAEs 22 (shown in dashed lines), a plurality of power supplies 26, a first vertical spine 30 located adjacent the sidewall 20-2, a second vertical spine located adjacent the sidewall 20-1 (both not visible), a patch panel 40 (FIG. 2), and a plurality of power regulators 44 (FIG. 2). A general reference to a chassis, as used herein, can refer to any one or more of the DAEs 22, power supplies 26, patch panel 40, and power regulators 44. Each chassis 22, 26, 40, 44 is a field replaceable unit (FRU) and is individually serviceable from its front end when installed in the rack 14.

In the data storage system 10, the DAEs 22 are modular, each having a plurality of redundant disk drives (divided into side A and side B), a front side, a rear side, rear cabling, and front-to-rear cooling. At the rear of each DAE 22 are an electrical signal connector and electrical plug that "hot" plug into respective cable assemblies on the vertical spines 30, as described in more detail below. For some embodiments of DAEs 22, the disk drives are individually serviceable within the DAE. In one embodiment, each DAE 22 has a 3U height and 12" depth.

In FIG. 1 and FIG. 2, the front and rear compartments reserved for DAEs are fully populated: on the front side 16, a first stack of DAEs 22 is disposed above the power supplies 26; at the rear side 18, a second stack of DAEs 22 is disposed above the patch panel 40 and power regulators 44. A gap (approx. 1 U) separates each stack of DAEs from the patch panel 40 or power supplies 26. Although shown fully populated with DAEs 22, the data storage system 10 can operate with as few as a single DAE 22. The modular construction of the data storage system 10 and its various FRUs allows the addition of DAEs 22 on an as-needed basis.

The patch panel 40 is an individual chassis having various modules for defining the functional behavior of the data storage system 10. Depending upon the particular types of modules in use, the DAEs 22 of the data storage system 10 can operate, for example, as a Network Application Storage system, as a Storage Area Network, or as a combination thereof. Egress and ingress of communication signals out of and into the data storage system 10 is through the patch panel 40 over cabling 41. A source of power can enter the data storage system 10 from below (e.g., into the power regulators 44).

Figure 3:
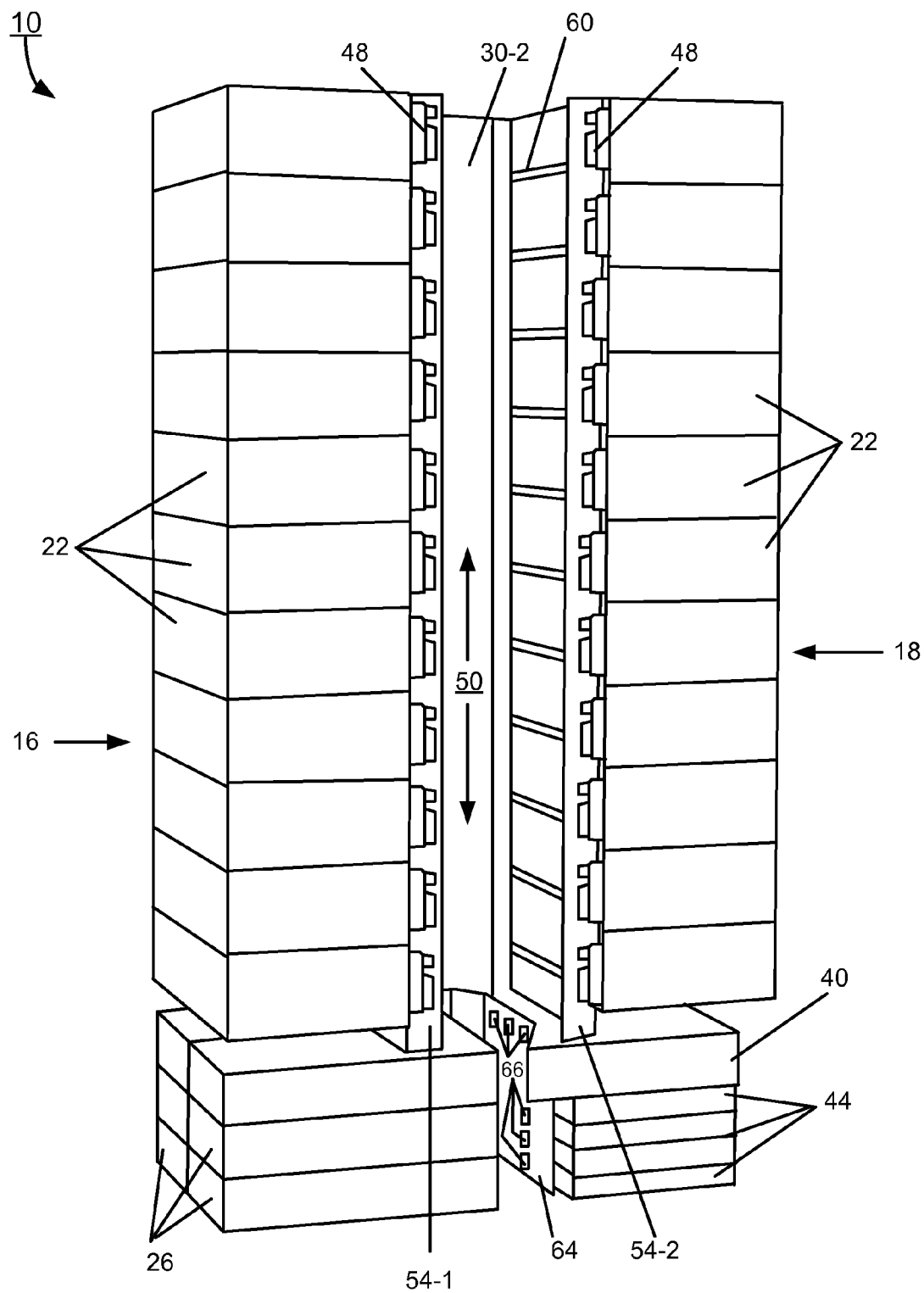
FIG. 3 is a schematic diagram of the data storage system of FIG. 2, with a vertical spine removed to expose interior features of the system.

FIG. 3 shows a side view of the data storage system 10 with the spine 30 removed to reveal a central chimney (or air plenum) 50 defined on two sides by opposing spatially separated interior panels 54-1, and 54-2. The bases of the interior panels 54-1, 54-2 abut the top surfaces of power supplies 26 and of the patch panel 40, respectively. Also revealed are external DAE connector assemblies 48 extending from the rear side of each DAE 22, a second vertical spine 30-2 at the opposite sidewall of the rack 14 disposed between the interior panels 54-1, 54-2, and baffles 60 on the interior panel 54-2. The other interior panel 54-1 has similar baffles, one for each DAE 22, although not visible in FIG. 3. As used herein, a DAE connector assembly 48 is considered to include an electrical plug and an electrical signal connector, although such electrical components may be structurally and functionally separate and not part of the same structure.

Also shown, the patch panel 40 includes a midplane 64 extending downwards generally orthogonal from the rear side of the patch panel 40. The midplane 64 extends downwards behind and between the power supplies 26 and power regulators 44. Power and communication signals pass to and from the midplane 64, which functions to route power and such signals from source to destination. Electrical connector assemblies 66, of which a representative number are shown, are on each side of the midplane 64. The power supplies 26 and power regulators 44 connect from opposite sides to the midplane 64 through some of these connector assemblies 66. DAEs 22 connect to the midplane 64 through others of these connector assemblies 66, as described in connection with FIG. 5.

Figure 4:
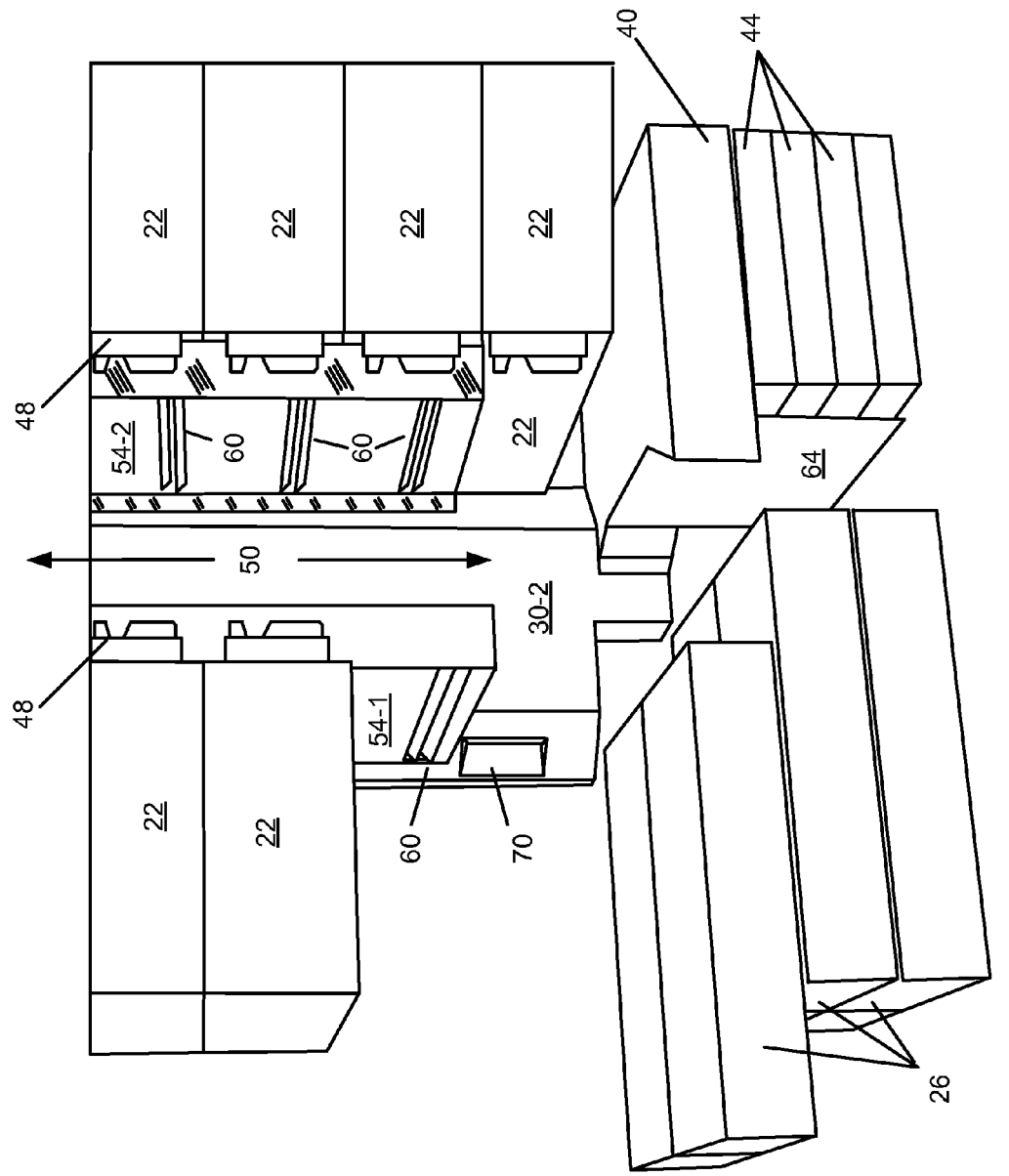
FIG. 4 is a schematic diagram of a lower region of the data storage system, with power supplies and internal panels partially removed to expose additional details of interior features of the system.

FIG. 4 shows a side view of a lower region of the data storage system 10 of FIG. 3, from which the spine 30, lower sections of interior panels 54-1, 54-2, and two DAEs 22 are removed in order to reveal the spine 30-2 and baffles 60 in more detail. In this embodiment, the spine 30-2 has a recessed region 70 into which a connector assembly 48 can extend from the rear of the DAE 22 can enter (for engaging a corresponding connector assembly of the spine 30-2, not shown).

Figure 5:
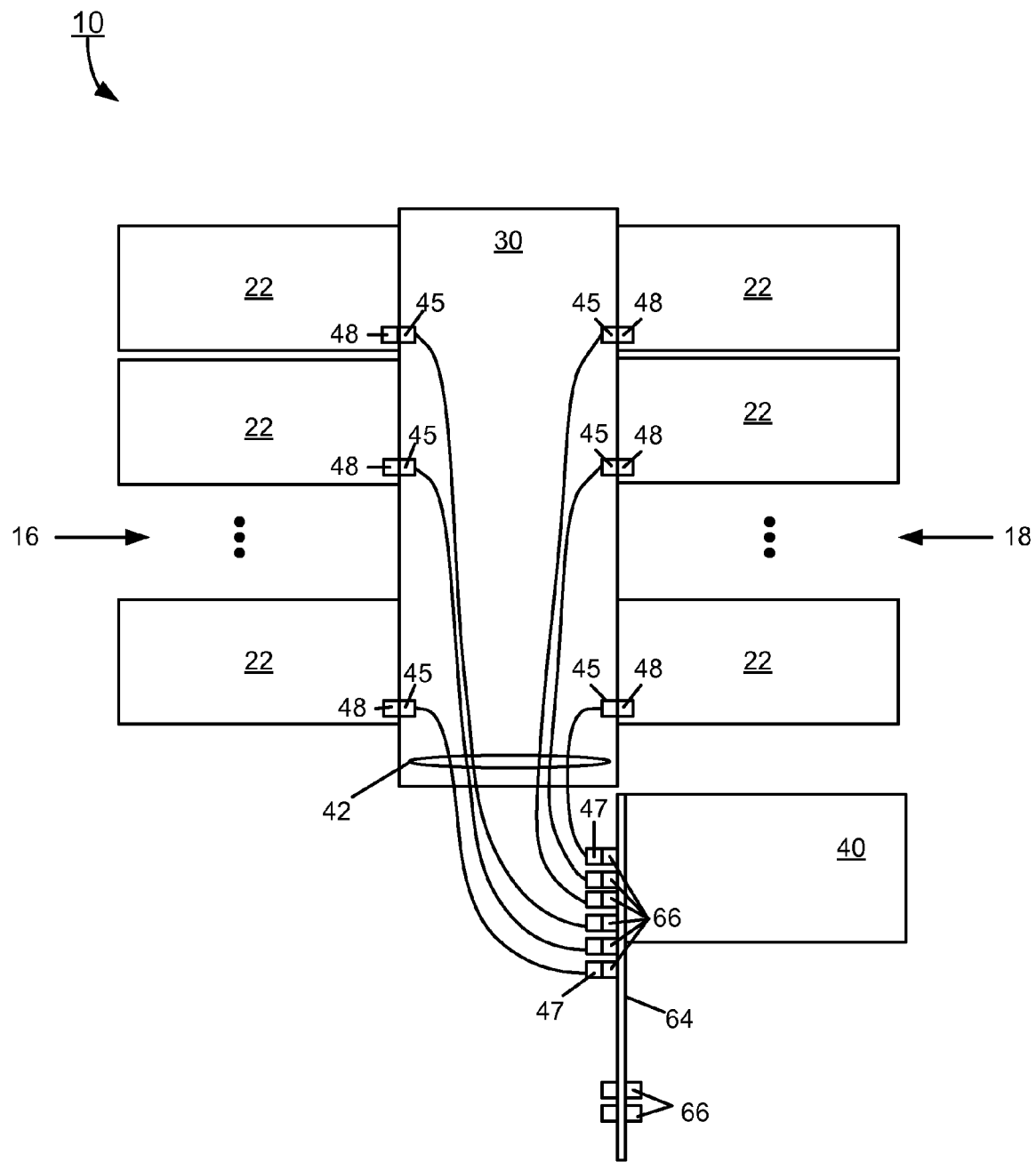
FIG. 5 is a side view of an illustrative portion of the data storage system, with back-to-back data array enclosures electrically connected to a midplane by way of cables that traverse through a vertical spine.

FIG. 5 shows a side view of the data storage system 10 including a plurality of front-side DAEs 22 and rear-side DAEs 22 plugged into the spine 30. The connections to the spine 30 are representative of similar connections by the DAEs 22 to the other spine 30-2. To simplify the illustration, the power supplies 26, power rectifiers 44, and many of the DAEs 22 are missing from the FIG.

Each spine 30 is comprised of passive components: cables (wires) 42, connector assemblies 45, metal, and plastic. For serviceability, the spines 30 can have side access panels. Preinstalled, permanently mounted to the rack 14 (not shown), and pre-wired with cables (or wires) 42, each vertical spine 30 is in general a conduit for cables 42 that conduct communication (e.g., I/O) and power signals between the DAEs 22 and the midplane 64 (located in the lower rear section of the data storage system 10). Each cable 42 extends from a cable assembly 47 coupled to a midplane connector 66, traverses through a portion of the spine 30, and terminates at a spine connector assembly 45. This spine connector assembly 45 connects to a corresponding electrical connector assembly 48 on the DAE 22.

Figure 6:
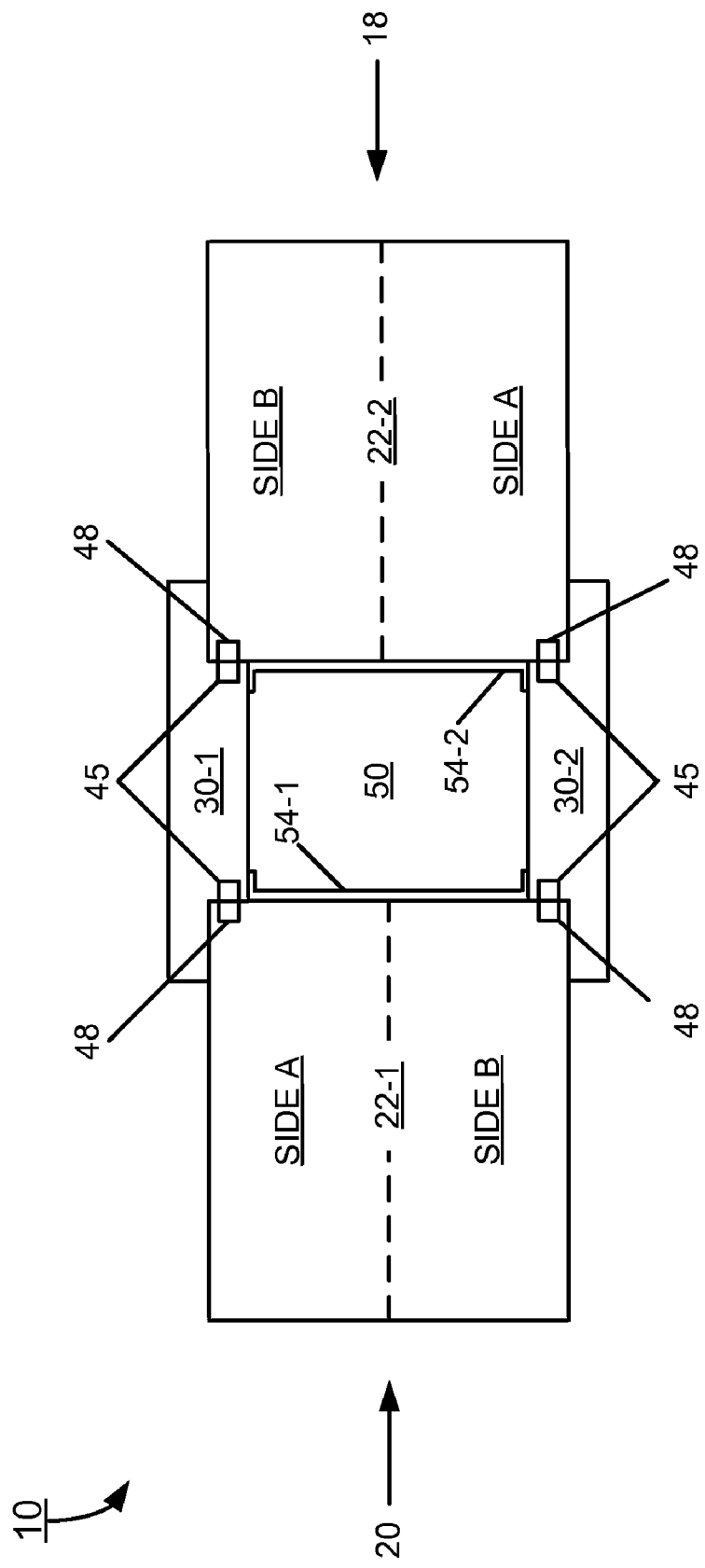
FIG. 6 is a top view of the data storage system, with back-to-back data array enclosures, each electrically plugged into vertical spines on opposite sidewalls of the rack.

FIG. 6 shows a top view of the data storage system 10 having a central chimney 50 separating back-to-back DAEs 22-1, 22-2. In one embodiment, approximately 12" (of central chimney) separates the back-to-back DAEs 22-1, 22-2. Defined on two sides by the opposing interior panels 54-1, 54-2, and on two other sides by the inner-facing walls of opposing spines 30-1, 30-2, the central chimney 50 extends almost the full height of the data storage system 10 and exhausts air through the top.

Each DAE 22 has redundant disk drives partitioned into Side A and Side B. Side A of the DAE 22-1 and Side B of the DAE 22-2 are electrically connected to the spine 30-1 through mated connector assemblies 45, 48. Similarly, Side B of the DAE 22-1 and Side A of the DAE 22-2 are electrically connected to the spine 30-2 through mated connector assemblies 45, 48. It is to be understood that the partitioning is illustrative; the disk drives do not need to be partitioned as shown in FIG. 6. When plugged into the spines 30, the rear side of each DAE 22-1, 22-2 abuts one of the interior panels 54-1, 54-2, forcing open a baffle to permit the passage of air. Each DAE 22 blows air from front-to-rear and exhausts into the central chimney 50 through the open baffle.

Figure 7:
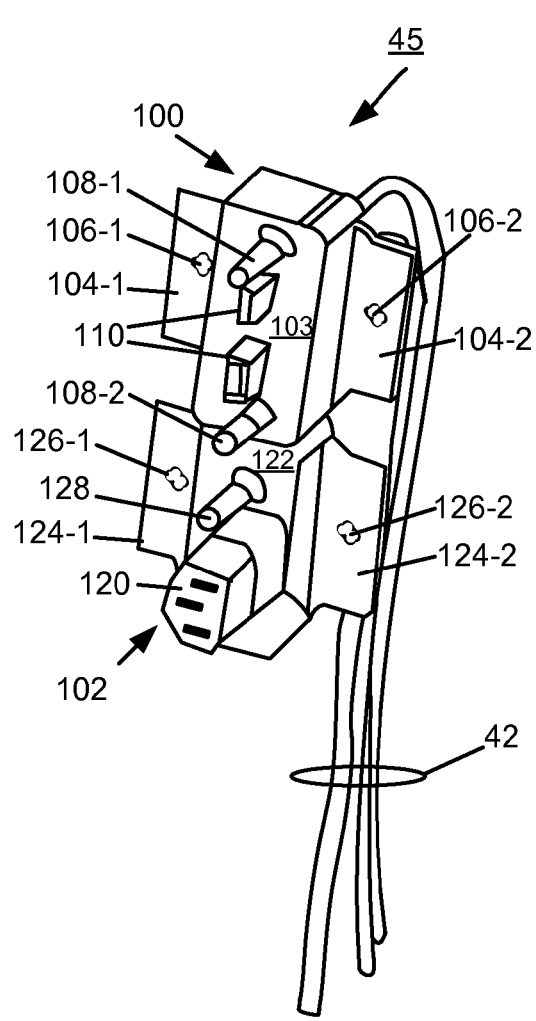
FIG. 7 is a front view of an embodiment of a spine connector assembly.

FIG. 7 shows an embodiment of the spine connector assembly 45 (of FIGS. 5 and 6). The spine connector assembly 45 includes an embodiment of a data signal cable assembly 100 and an embodiment of a power cable assembly 102. Although shown and described hereafter as separate assemblies, the data signal cable assembly 100 and power cable assembly 102 can be constructed integrally as a single cable assembly.

The data signal cable assembly 100 is integrally constructed and has an assembly body 103 and a pair of flanges 104-1, 104-2 (generally, 104) on opposite sides of the assembly body 103. A pair of alignment pins 108-1, 108-2 (generally, 108) and a pair of data signal connectors 110 extend orthogonally from the assembly body 103. Each flange 104-1, 104-2 has a respective cross-shaped opening 106-1, 106-2 (generally, 106) formed therein.

The alignment pins 108 facilitate blind mating between the data signal connectors 110 and corresponding electrical signal connectors of the DAE chassis 22. One alignment pin 108-1 is longer than the other 108-2. The longer alignment pin 108-1 is the first portion of the data signal cable assembly 100 to encounter the back end of the DAE chassis 22 as the chassis slides into the compartment in the rack. In this embodiment, the alignment pins 108 and data signal connectors 110 are arranged vertically (with respect to the chassis), with one alignment pin 108 on either side of the data signal connectors 110. The use of two alignment pins 108 is illustrative; a single alignment pin can suffice for purposes of blind mating.

The data signal connectors 110 conduct data communications to and from the DAE 22. In one embodiment, one of the data signal connectors is a primary port and the other data signal connector is an expansion port of a Fibre Channel or Infiniband® interface. The connector type can be the High-Speed Serial Data Connector (HSSDC2) for Fibre Channel. Other types of data signal connectors may be used in the practice of the invention (e.g., a Small Computer System Interface (SCSI) connector or a modular connector, e.g., any of the Registered Jack or RJ-series connectors). In addition, the data signal cable assembly 100 can have fewer or more than two data signal connectors. Those embodiments of data signal cable assemblies having multiple data signal connectors can be configured to transport different signal types on the same data signal cable assembly (e.g., Fibre Channel and Ethernet).

The power cable assembly 102 is integrally constructed and includes an assembly body 122 and a pair of flanges 124-1, 124-2 (generally, 124) on opposite sides of the assembly body 122. Each flange 124-1, 124-2 has a respective cross-shaped opening 126-1, 126-2 (generally, 126) formed therein. An alignment pin 128 and an electrical plug receptacle 120 extend orthogonally from the assembly body 122. The alignment pin 128 facilitates blind mating between the electrical plug receptacle 120 and a corresponding electrical plug of the DAE chassis 22. The alignment pin 128 can be longer, shorter, or of the same length as the longer of the two alignment pins 108 of the data signal cable assembly 100. In this embodiment, the electrical plug receptacle 120 and alignment pin 128 are disposed vertically (with respect to the chassis), with the alignment pin 128 above the electrical plug receptacle 120.

Figure 8:
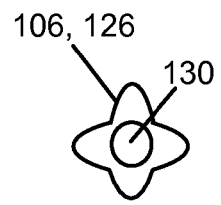
FIG. 8 is a front view of an embodiment of an opening in a flange through which a fastener passes to couple the spine connector assembly movably to the spine.
Figure 9:
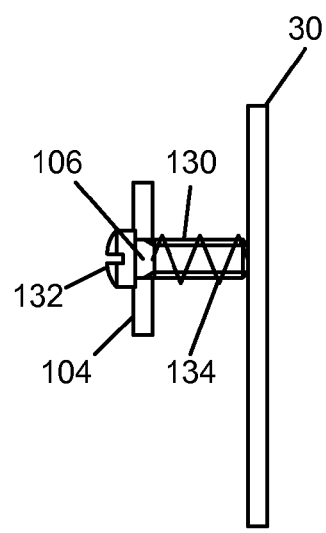
FIG. 9 is a side view of an embodiment of compression means disposed between the flange and the spine.

FIG. 8 shows a general outline of each flange opening 106, 126 in the cable assemblies 100, 102. A cross-section of the shaft 130 of a fastener is shown in the center of the opening 106, 126. The diameter of the shaft 130 relative to the size and shape of the opening 106, 126 allows for side-to-side (X-direction) and up-and-down (Y-direction) movement of the cable assembly when the chassis plugs into the spine 30. Such movement absorbs permitted tolerances in the placement of the electrical connector and electrical plug on the chassis and in the placement of the cable assemblies 100, 102 on the panel of the spine 30. To absorb tolerances in the Z-direction (front-to-back and back-to-front), compression means, such as springs, foam backing, and elastomers, can be placed between the flanges of the cable assemblies and the panel of the spine. For example, FIG. 9 shows a fastener 132 passing through the opening 106 in the flange 104 and penetrating the panel of the spine 30. Coiled around the shaft 130 of the fastener 132, between the flange 104 and the spine panel, is a spring 134.

Figure 10:
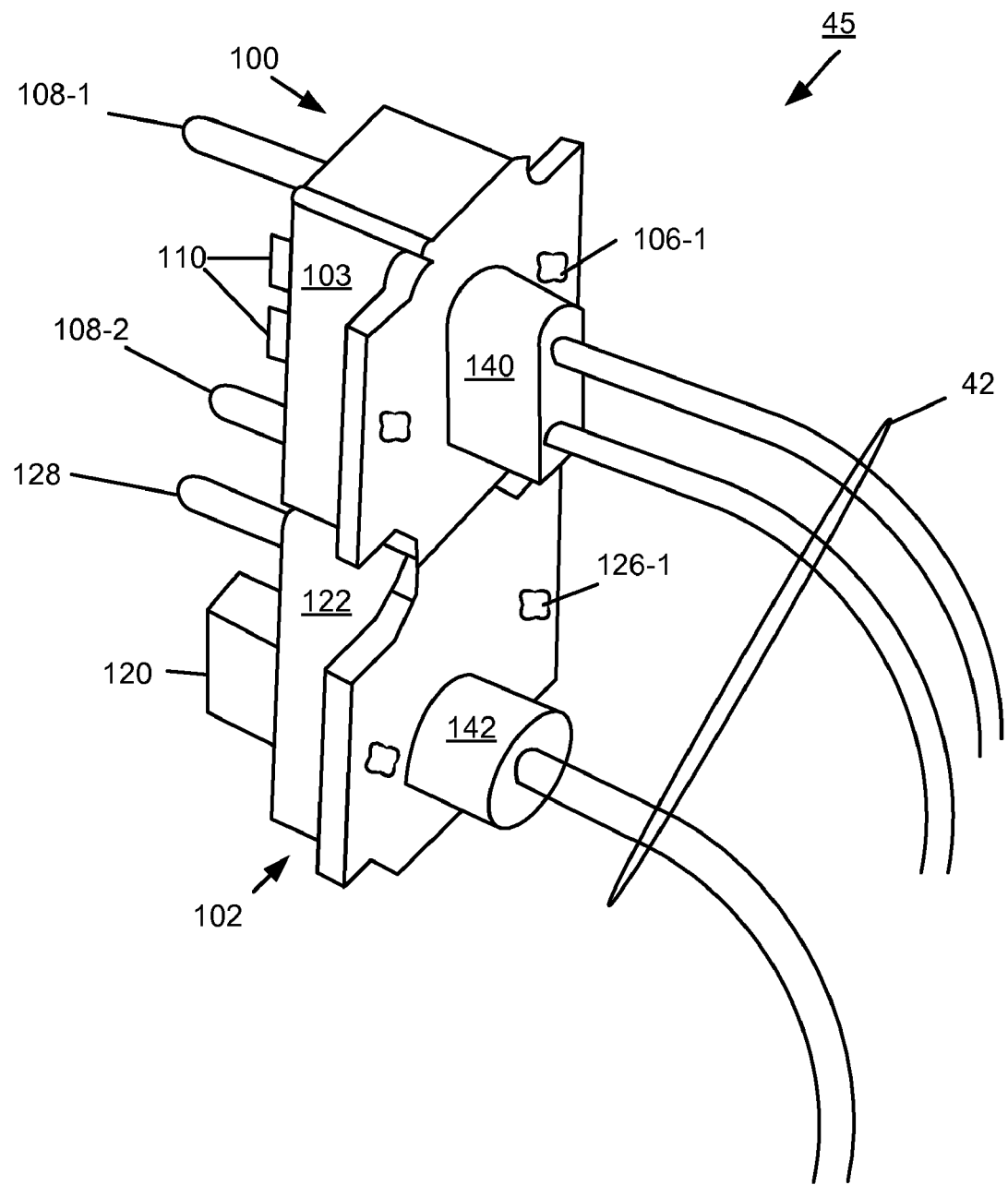
FIG. 10 is a rear view of the spine connector assembly of FIG. 7.

FIG. 10 shows a rear side of the cable assemblies 100, 102 of FIG. 7. Each cable assembly includes an overmold 140, 142, respectively, for securing the cables 42 to the backs thereof. At the other end of the cables 42 (not shown) are cable assemblies with the same or similar structural and functional features as cable assemblies 100, 102, features that facilitate blind mating and hot plugging of the chassis.

Figure 11:
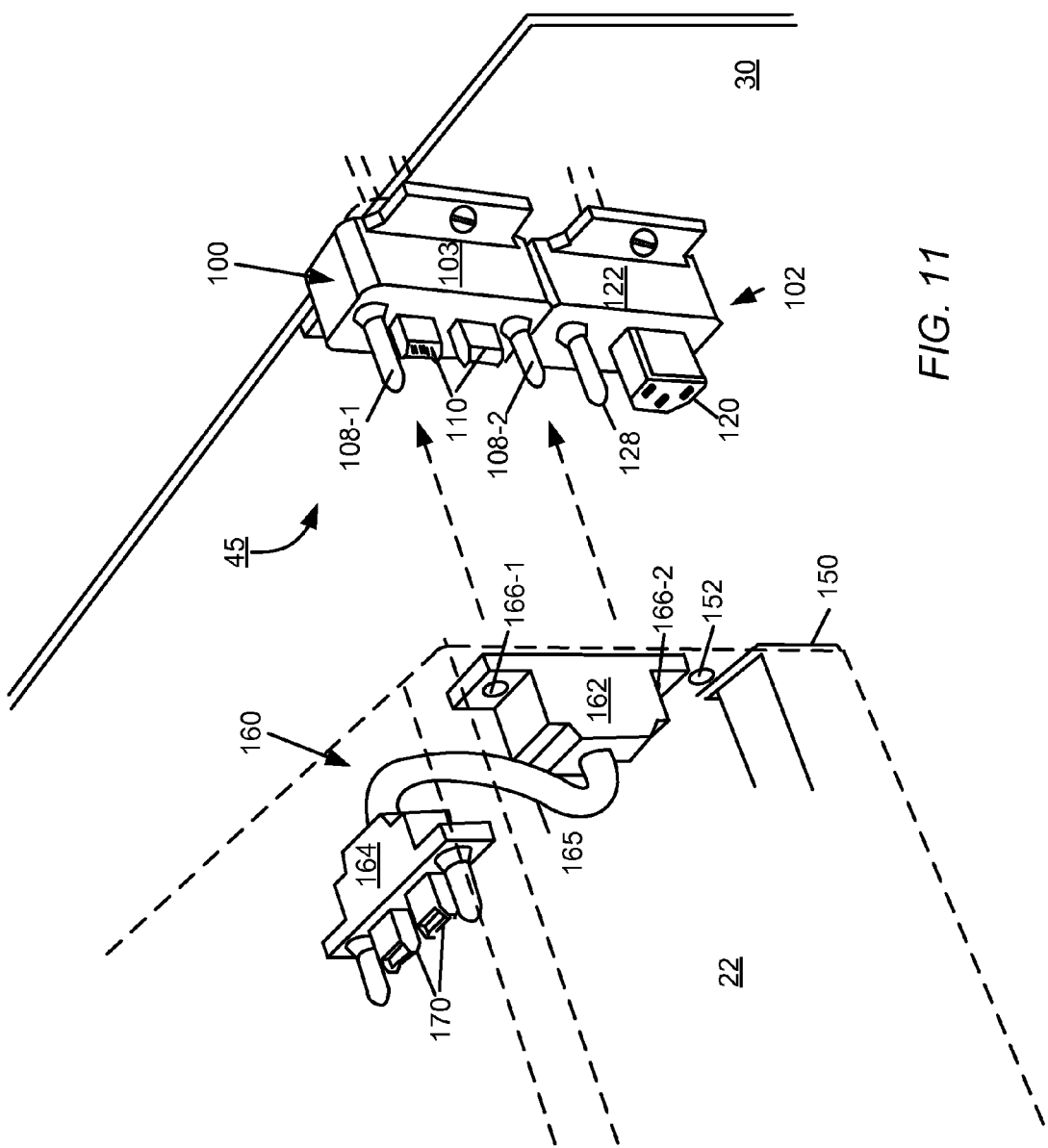
FIG. 11 is an isometric view of a chassis plugging into the spine connector assembly.

FIG. 11 shows a dashed outline of a rear side of a DAE 22 about to join the spine connector assembly 45. The spine connector assembly 45 is movably fixed to a panel portion of the spine 30, while the DAE 22 moves toward the spine connector assembly 45. The DAE 22 includes an electrical plug 150 and a connector assembly interface 160. The electrical plug 150 is aligned to enter the electrical plug receptacle 120 of the power cable assembly 102. Above the electrical plug 150 in the rear face of the DAE 22 is an alignment pin guide 152, which is aligned to receive the alignment pin 128 of the power cable assembly 102.

The connector assembly interface 160 includes a vertically oriented data signal cable assembly 162 connected to a horizontally oriented data signal cable assembly 164 by a cable 165. An LCC (link control card) in the DAE 22—not shown—electrically connects to the data signal cable assembly 100 of the spine connector assembly 45 through the connector assembly interface 160. The vertically oriented data signal cable assembly 162 interfaces with the data signal cable assembly 100; the horizontally oriented data signal cable assembly 164 interfaces with the LCC. In this intermediary position, the connector assembly interface 160, rather than the LCC, absorbs the brunt of the force used to plug the DAE 22 into the spine 30. When the DAE 22 plugs into the spine 30, the data signal cable assembly 162 joins with the data signal cable assembly 100 and the electrical plug 150 joins the electrical plug receptacle 120, concurrently. After the joining, the data signal connectors 170 of the data signal cable assembly 164 conduct the communication signals to and from the corresponding data signal connectors 110 of the data signal cable assembly 100.

Figure 12:
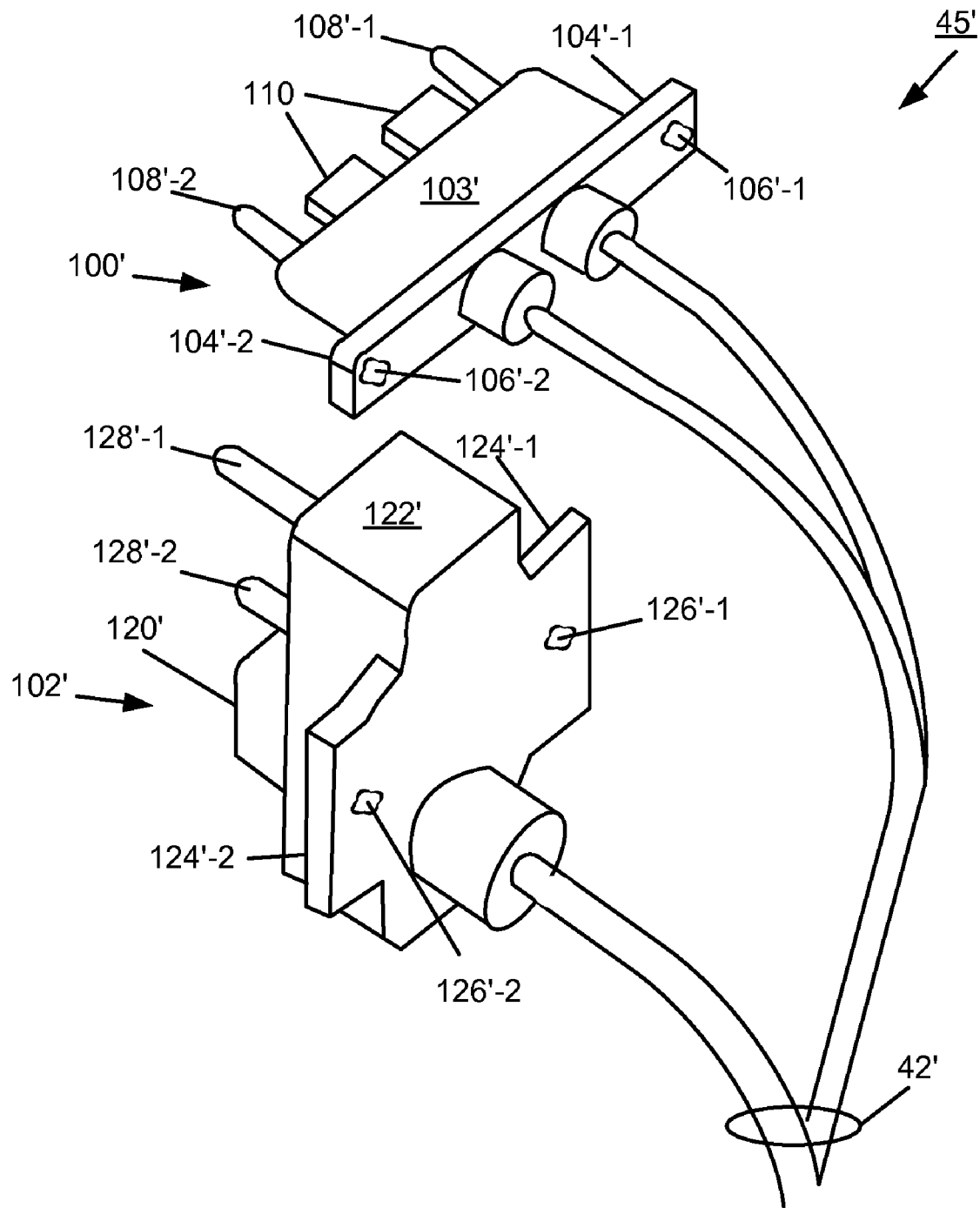
FIG. 12 is a front view of another embodiment of a spine connector assembly.

FIG. 12 shows another embodiment of a spine connector assembly 45' having a data signal cable assembly 100' and a power cable assembly 102'. Although shown and described hereafter as separate assemblies, the data signal cable assembly 100' and power cable assembly 102' can be constructed integrally as a single cable assembly.

The data signal cable assembly 100' is integrally constructed and has an assembly body 103' and a pair of flanges 104'-1, 104'-2 (generally, 104') on opposite sides of the assembly body 103'. A pair of alignment pins 108'-1, 108'-2 (generally, 108') and a pair of data signal connectors 110' extend orthogonally from the assembly body 103'. Each flange 104'-1, 104'-2 has a respective cross-shaped opening 106'-1, 106'-2 (generally, 106') formed therein.

The alignment pins 108' and data signal connectors 110' used in this embodiment of data signal cable assembly 100' are structurally and functionally similar to those described in connection with the data signal cable assembly 100 of FIG. 7. In this embodiment, the alignment pins 108' and data signal connectors 110' are arranged horizontally (with respect to the chassis), with one alignment pin 108' on either side of the data signal connectors 110'.

The power cable assembly 102' is integrally constructed and includes an assembly body 122' and a pair of flanges 124'-1, 124'-2 (generally, 124') on opposite sides of the assembly body 122'. Each flange 124'-1, 124'-2 has a respective cross-shaped opening 126'-1, 126'-2 (generally, 126') formed therein. A pair of alignment pins 128'-1, 128'-2 (generally, 128') and an electrical plug receptacle 120' extend orthogonally from the assembly body 122'. The alignment pin 128'-1 and electrical plug receptacle 120' used in this embodiment of data signal cable assembly 100' are structurally and functionally similar to those described in connection with the data signal cable assembly 100 of FIG. 7. The additional alignment pin 128'-2 further facilitates blind mating. In this embodiment, the electrical plug receptacle 120' and alignment pins 128' are disposed vertically (with respect to the chassis), with the alignment pins 128' above the electrical plug receptacle 120'.

Figure 13:
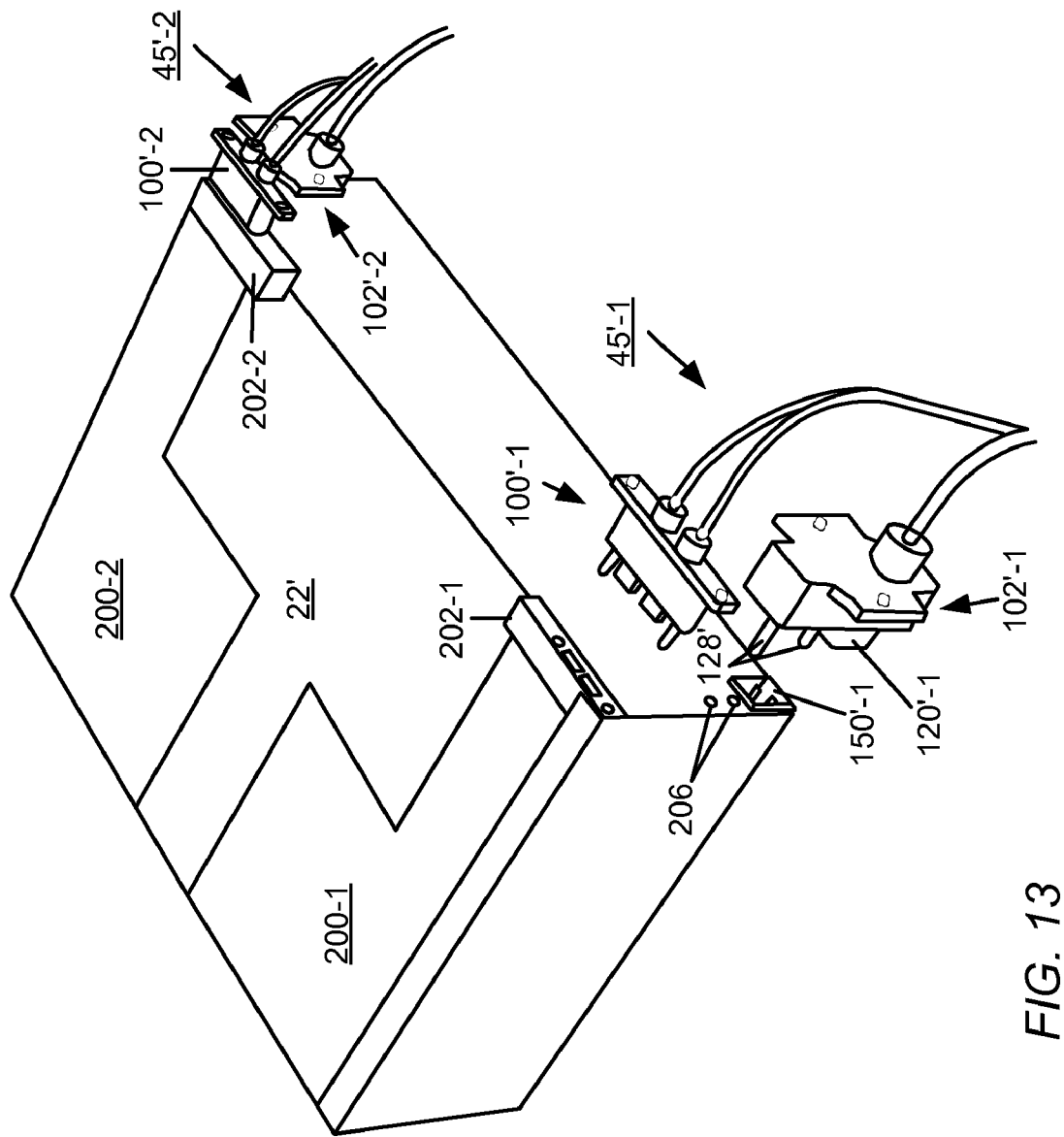
FIG. 13 is a rear view of a chassis plugging into two spine connector assemblies of FIG. 12.

FIG. 13 shows an embodiment of a DAE 22 about to plug into a first spine connector assembly 45'-1 and, for illustration purposes only, already plugged into a second spine connector assembly 45'-2. In practice, the DAE 22' plugs into both spine connector assemblies 45'-1, 45'-2 concurrently when the DAE 22' is installed into the rack. At DAE installation, the spine connector assemblies 45' are movably fixed to opposing spines 30-1, 30-2 (FIG. 6), while the DAE 22' moves toward the spine connector assemblies 45'. The DAE 22' includes an electrical plug 150'-1, 150'-2 (generally 150') and LCCs 200-1, 200-2 (generally, 200). (The electrical plug 150'-2 is obscured by the plugged in power cable assembly 102'-2). Each LCC 200-1, 200-2 has a horizontally oriented data signal connector 202-1, 202-2, respectively, at a back end thereof. The data signal connector 202-1 directly connects to the data signal cable assembly 100'-1 of the spine connector assembly 45'-1; the data signal connector 202-2 directly connects to the data signal cable assembly 100'-2 of the spine connector assembly 45'-2.

The electrical plug 150'-1 is aligned to enter the electrical plug receptacle 120'-1 of the power cable assembly 102'-1. Above the electrical plug 150'-1 in the rear face of the DAE 22' are alignment pin guides 206, which receive the alignment pins 128' of the power cable assembly 102'-1. When the DAE 22' plugs into the spines 30-1, 30-2, the data signal connectors 202-1, 202-2 join with respective data signal cable assemblies 100'-1, 100'-2 and the electrical plugs 150'-1, 150'-2 join respective power cable assemblies 102'-1, 102'-2, concurrently.

While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. An electronics system comprising:
a chassis housing a plurality of disk drives, the chassis having a back end, and an electrical plug and an electrical signal connector at the back end;
a rack having opposing sidewalls and a compartment for receiving the chassis;
a cable conduit mounted to one of the sidewalls of the rack adjacent the compartment for receiving the chassis, the cable conduit having a panel portion that abuts the back end of the chassis; and
first and second cable assemblies coupled to the panel portion of the cable conduit facing the chassis, the first cable assembly including an electrical plug receptacle and a first cable that extends through a length of the cable conduit for conducting power from a power source to the electrical plug receptacle, the second cable assembly including a data signal connector and a second cable that extends through a length of the cable conduit for conducting data signals to and from the data signal connector, the electrical plug receptacle receiving the electrical plug and the data signal connector receiving the electrical signal connector of the chassis, concurrently, when the chassis fully slides into the compartment in the rack, thereby supplying power to and establishing data signal communications with the chassis.

2. The electronics system of claim 1, wherein each cable assembly includes a flange with a cross-shaped opening formed therein, and further comprising fastening means, for each cable assembly, for entering through the cross-shaped opening of the flange and movably coupling that cable assembly to the panel portion of the cable conduit.

3. The electronics system of claim 2, further comprising compression means disposed between each flange and the panel portion of the cable conduit.

4. The electronics system of claim 1, wherein each cable assembly includes at least one alignment pin and the back end of the chassis includes corresponding alignment pin guides to facilitate blind mating between the electrical plug receptacle and the electrical plug and between the data signal connector and the electrical signal connector of the chassis when the chassis fully slides into the compartment in the rack.

5. The electronics system of claim 1, wherein at least one of the cable assemblies includes a pair of alignment pins, with one of the alignment pins being longer than the other alignment pin, and the back end of the chassis includes corresponding alignment pin guides to facilitate blind mating between the chassis and the cable conduit when the chassis fully slides into the compartment in the rack.

6. The electronics system of claim 1, wherein the second cable assembly is integrally constructed and includes multiple data signal connectors.

7. The electronics system of claim 6, wherein the second cable assembly is includes a pair of alignment pins, one alignment pin on each side of the multiple data signal connectors.

8. The electronics system of claim 7, wherein the alignment pins and data signal connectors are vertically arranged with respect to the back end of the chassis.

9. The electronics system of claim 1, wherein the second cable assembly is integrally constructed and includes multiple data signal connectors for different types of data signal communications.

10. The electronics system of claim 1, wherein the first and second cable assemblies are integrally constructed as a single cable assembly.

11. An electronics system comprising:
a chassis housing a plurality of disk drives, the chassis having a back end and an electrical plug at the back end;
a rack having opposing sidewalls and a compartment for receiving the chassis;
a cable conduit mounted to one of the sidewalls of the rack adjacent the compartment for receiving the chassis, the cable conduit having a panel portion that abuts the back end of the chassis; and
a cable assembly coupled to the panel portion of the cable conduit facing the chassis, the cable assembly including an electrical plug receptacle and a cable that extends through a length of the cable conduit for conducting power from a power source to the electrical plug receptacle, the electrical plug receptacle receiving the electrical plug of the chassis when the chassis fully slides into the compartment in the rack, thereby supplying power to the chassis.

12. The electronics system of claim 11, wherein the cable assembly includes a flange with a cross-shaped opening formed therein, and further comprising fastening means for entering through the cross-shaped opening of the flange and movably coupling the cable assembly to the panel portion of the cable conduit.

13. The electronics system of claim 12, further comprising compression means disposed between the flange and the panel portion of the cable conduit.

14. The electronics system of claim 11, wherein the cable assembly includes at least one alignment pin and the back end of the chassis includes corresponding alignment pin guides to facilitate blind mating between the electrical plug receptacle and the electrical plug of the chassis when the chassis fully slides into the compartment in the rack.

15. An electronics system comprising:
a chassis housing a plurality of disk drives, the chassis having a back end and an electrical signal connector at the back end;
a rack having opposing sidewalls and a compartment for receiving the chassis;
a cable conduit mounted to one of the sidewalls of the rack adjacent the compartment for receiving the chassis, the cable conduit having a panel portion that abuts the back end of the chassis; and
a cable assembly coupled to the panel portion of the cable conduit facing the chassis, the cable assembly including a data signal connector and a cable that extends through a length of the cable conduit for conducting data signals to and from the data signal connector, the data signal connector receiving the electrical signal connector of the chassis when the chassis fully slides into the compartment in the rack, thereby establishing data signal communications with the chassis.

16. The electronics system of claim 15, wherein the cable assembly includes a flange with a cross-shaped opening formed therein, and further comprising fastening means for entering through the cross-shaped opening of the flange and movably coupling the cable assembly to the panel portion of the cable conduit.

17. The electronics system of claim 16, further comprising compression means disposed between the flange and the panel portion of the cable conduit.

18. The electronics system of claim 15, wherein the cable assembly includes at least one alignment pin and the back end of the chassis includes corresponding alignment pin guides to facilitate blind mating between the data signal connector and the electrical signal connector of the chassis when the chassis fully slides into the compartment in the rack.

19. The electronics system of claim 15, wherein the cable assembly is integrally constructed and includes multiple data signal connectors.

20. The electronics system of claim 19, wherein the cable assembly is includes a pair of alignment pins, one alignment pin on each side of the multiple data signal connectors.

21. The electronics system of claim 20, wherein the alignment pins and data signal connectors are vertically arranged with respect to the back end of the chassis.

22. The electronics system of claim 15, wherein the cable assembly is integrally constructed and includes multiple data signal connectors for different types of data signal communications.

* * * * *